United States Patent [19]
Furusawa

[11] Patent Number: 5,805,152
[45] Date of Patent: Sep. 8, 1998

[54] VIDEO PRESENTATION SYSTEM

[75] Inventor: Toyoaki Furusawa, Kawasaki, Japan

[73] Assignee: Fujitsu Limited, Kawasaki, Japan

[21] Appl. No.: 525,170

[22] Filed: Sep. 8, 1995

[30] Foreign Application Priority Data

Dec. 20, 1994 [JP] Japan .................................. 6-316113

[51] Int. Cl.⁶ .................................................. G06T 1/00
[52] U.S. Cl. ......................... 345/302; 348/161; 395/680; 382/181; 235/462
[58] Field of Search .................................... 395/806, 807, 395/680; 235/462; 463/36; 455/66; 345/302; 348/161; 382/100, 181, 190, 312

[56] References Cited

U.S. PATENT DOCUMENTS

| | | | |
|---|---|---|---|
| 4,499,503 | 2/1985 | Suzuki | 358/316 |
| 5,093,873 | 3/1992 | Takahashi | 382/61 |
| 5,528,263 | 6/1996 | Platzker et al. | 345/156 |
| 5,539,871 | 7/1996 | Gibson | 395/154 |
| 5,553,221 | 9/1996 | Reimer et al. | 345/333 |
| 5,579,537 | 11/1996 | Takahisa | 455/66 |
| 5,600,775 | 2/1997 | Kling et al. | 707/500 |

FOREIGN PATENT DOCUMENTS

| | | |
|---|---|---|
| 0 206 565 | 12/1986 | European Pat. Off. . |
| 2 044446 | 10/1980 | United Kingdom . |
| 2 126460 | 3/1984 | United Kingdom . |
| 2 166627 | 5/1986 | United Kingdom . |
| 2 232316 | 12/1990 | United Kingdom . |
| 2 276 520 | 9/1994 | United Kingdom . |

Primary Examiner—Joseph H. Feild

[57] ABSTRACT

A video presentation system which easily and economically realizes subject-service linkage in a video image displayed on its screen. The system includes a video display for displaying video data containing a subject with an identifier on a display unit, an identifier recognition unit for recognizing the identifier displayed on the display unit, and a data storing unit for storing the video data and various data associated with the identifier. The system further includes a data management means for obtaining data associated with the recognized identifier from the data storing unit and sending the data to the video display. When the user selects the identifier, the identifier recognition unit recognizes the identifier and the data management unit obtains data associated with the identifier from the data storing unit and outputs to the display.

12 Claims, 11 Drawing Sheets

VIDEO PRESENTATION SYSTEM

BACKGROUND OF THE INVENTION

1. Field of the Invention

The present invention relates to a video presentation system, and more specifically, to a video presentation system applicable to interactive multimedia systems, wherein a user operation directly pointing at a subject in a video image will initiate actions linked thereto.

2. Description of the Related Art

With recent enhancements of audio-visual I/O devices as well as related software, a multimedia applications market has been rapidly expanding, and consequently, improved quality is required for the applications. The prime factors for quality improvement of those multimedia applications include advanced communication capability for senders and receivers through audio-visual media, and systematic linkage between video images and services.

As for the communications, interactive multimedia applications have become a focus of attention and many experimental trials are starting, however, no common communication protocol has been established on a world-wide basis in this field of interactive multimedia.

One of the ways, in conventional interactive multimedia systems, to systematically link subjects and services in a video image is to embed buttons for initiating services into the subjects in every frame of moving pictures. Those buttons involve associative information described by manual as where the subjects are located and what services are initiated for what kind of event. By operating with such buttons in a displayed video image, an event is selected and a service associated with the event is started.

For instance, a video introducing a house is on the screen and a door is now displayed as a specific subject. By clicking a button affixed to the door, another video clip for opening the door and showing the inside of the room is searched for, and a service of displaying the video clip is initiated. In the newly appeared screen, by clicking a button affixed to a piece of furniture provided in the room, another service starts and it displays or prints out various data concerning the furniture such as manufacturer, size and material.

The trouble is, however, that it takes much time and labor to create such video data. Since a video movie is constructed by pictures as many as 30 frames per second, the above-described conventional method of embedding a button into each picture will require an intolerably long time and much labor for creating an interactive video clip even for a few minutes. That is, development of interactive multimedia applications requires a lot of man-hours, and as a result, its total size will be enormous.

As such, it is very difficult to develop an interactive telecast software in a couple of hours or to create low-price multimedia software, and that is one of the factors blocking the realization of interactive multimedia. In order to solve this problem, it is demanded to establish a simple and easy method for communications and service linkage.

SUMMARY OF THE INVENTION

Taking the above into consideration, an object of the present invention is to provide a video presentation system, whereby linkage between subjects and services in a video image, which is essential in interactive multimedia applications, is easily realized at low cost.

To accomplish the above object, according to the present invention, there is provided a video presentation system in which a service related to a subject is initiated by pointing at the subject in a video image on a display unit. This video presentation system comprises video display means for displaying video data containing a subject with an identifier on a screen of the display unit. It also comprises identifier recognition means which recognizes the identifier displayed on the screen of the display unit and data storing means to store the video data and other various data associated with the identifier. The system further comprises data management means which obtains service data from the data storing means based upon the recognized identifier and sends the service data to the video display means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, an embodiment of the present invention will be outlined below.

Figure 1:
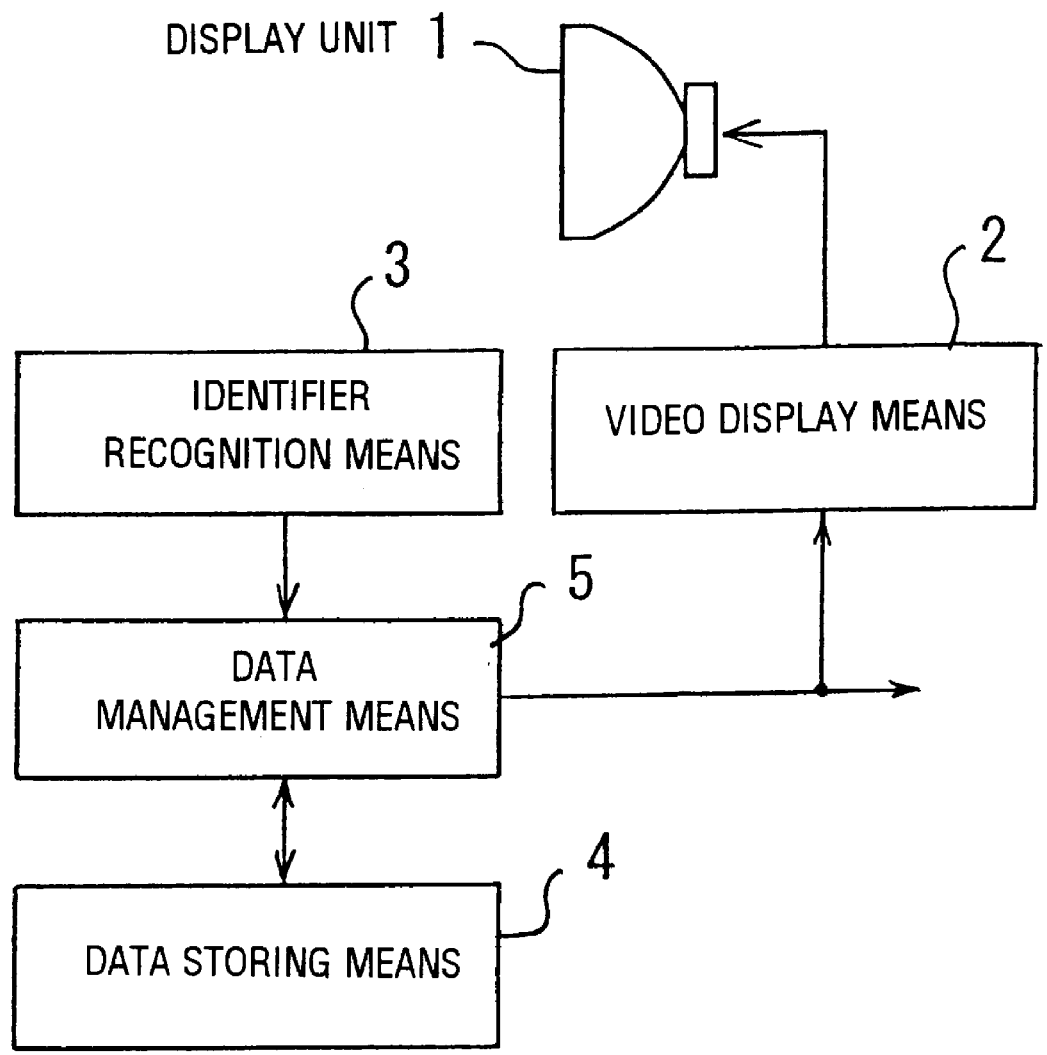
FIG. 1 is a conceptual view of a video presentation system according to the present invention.

FIG. 1 is a conceptual view of a video presentation system according to the present invention. The video presentation system comprises a video display unit or means 2 for displaying video data on a screen of a display unit 1, wherein the video data contains a subject with an identifier affixed thereto. The system also comprises an identifier recognition unit or means 3 for recognizing the identifier displayed on the screen of the display unit 1 and a data storing unit or means 4 for storing the video data and various data associated with the identifier. A data management unit or means 5 is connected to the output of the identifier recognition unit or means 3. The data management means 5 is also linked to the data storing means 4, from which the data management means 5 retrieves the data associated with the recognized identifier. The data management means 5 is further connected to the video display means 2 and other appropriate devices so that it will selectively send them the data obtained from the data storing means 4. That is, video data is sent to the video display means 2, while other data is sent to the other appropriate devices.

Next, operations of this video presentation system will be described below.

When a user selects an identifier affixed to a subject displayed on the screen of the display unit 1, the identifier recognition means 3 recognizes the selected identifier. Upon reception of the recognized identifier, the data management means 5 fetches data associated with the identifier from the data storing means 4. If the fetched data is video data, the data is sent to the video display means 2. If it is other data, it is transferred to other appropriate output devices (not shown). The video display means 2 displays the video data, which is associated with the identifier, on a screen of the display unit 1.

Figure 2:
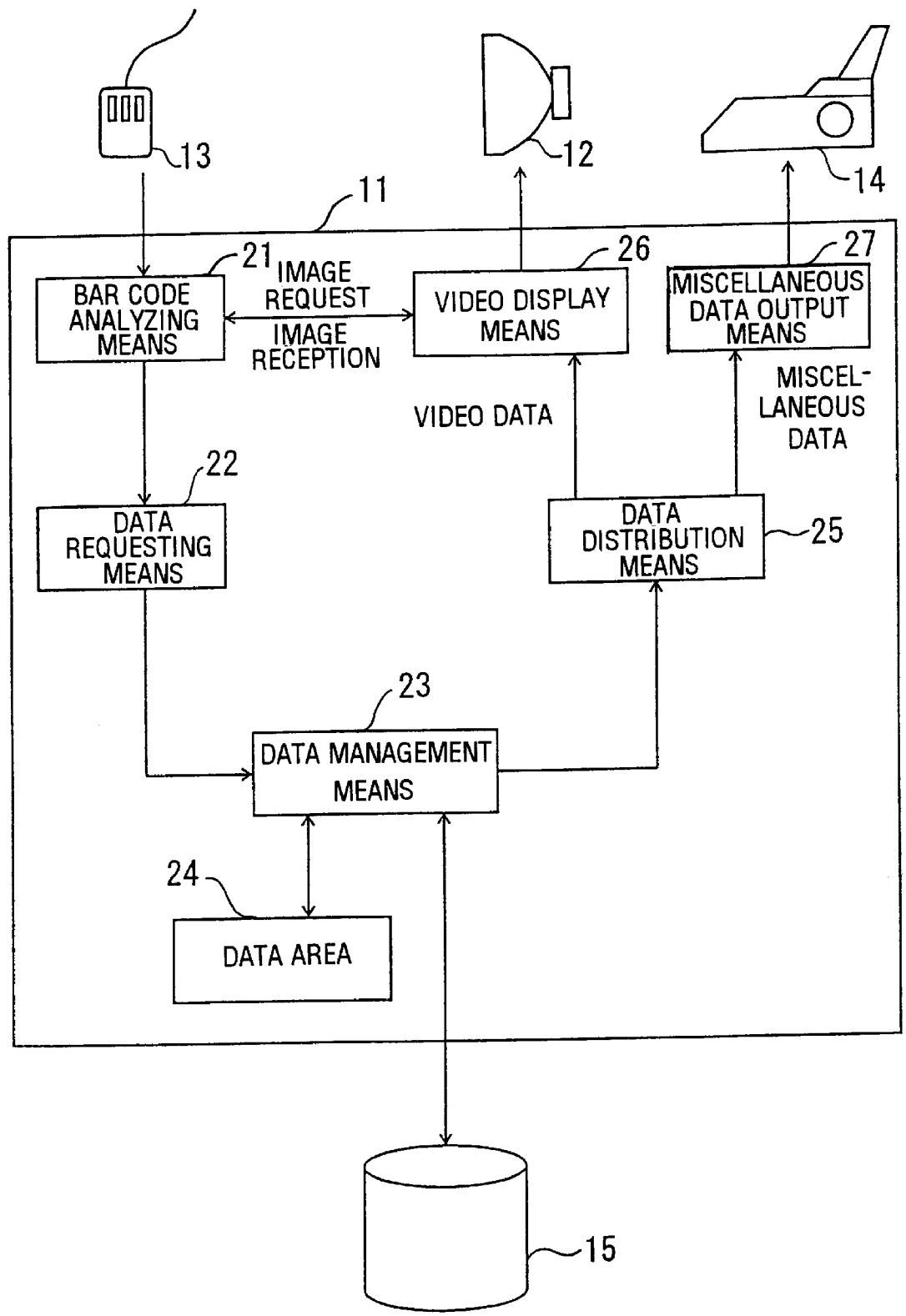
FIG. 2 illustrates a structure of a first embodiment of the present invention.

FIG. 2 illustrates a structure of a first embodiment of the present invention. Video presentation system shown in FIG. 2 is a stand-alone system which is organized so that a CPU/Memory processing unit 11 will solely support various operations for presentation such as management of video images, control of user operations and service provision in response to the user operations. The system utilizes bar codes for the identifiers to identify the subjects.

The CPU/Memory processing unit 11 links to a display unit 12 for displaying video images on the screen and also to a mouse 13 as a pointing device which returns coordinates of an on-screen position where a user has made a selecting action on the screen of the display unit 12.

The CPU/Memory processing unit 11 further links to peripheral units 14 such as printers and facsimile units and to an external data base unit 15.

The CPU/Memory processing unit 11 comprises the following means. Bar code analyzing unit or means 21 is connected to the mouse 13 so as to receive the coordinates therefrom. Data requesting unit or means 22, coupled to the bar code analyzing means 21, generates a request message based on a result of a bar code analysis. Data management unit or means 23, coupled to the data requesting means 22, receives the request message therefrom. A data area 24 is connected to the data management means 23. Data distribution unit or means 25 is linked to the data management means 23 so as to receive a result thereof. Video display unit or means 26, coupled to the video data output of the data distribution means 25, outputs the video data to the display unit 12 and also provide the bar code analyzing means 21 with image information required for bar code analysis. Miscellaneous data output unit or means 27 receives miscellaneous information excluding the video data from the data distribution means 25 and outputs it to the peripheral units 14. A mass-storage device, such as a hard disk or a CD-ROM is used for the data area 24. In addition, the data base unit 15, which resides outside of the CPU/Memory processing unit 11, is connected to the data management means 23 through a network or the like.

If a user makes a selecting action using the mouse 13 on a bar code which is affixed to a subject on the screen of the display unit 12, the mouse 13 informs the bar code analyzing means 21 of coordinate values of the position where the user has made the action. The bar code analyzing means 21 obtains video information from the video display means 26. It then determines whether a subject identifier (i.e., a bar code) exists or not at the position pointed at with the mouse 13, by discriminating an image data pattern of the identifier in the obtained video information. To be more specific, the system evaluates a sequence of pixels either in the vicinity of the position, on the raster, or in the area which the user has selected, and decides whether a particular pattern of the bar code is included or not in the sequence of pixels. If it is included there, an identifier code (i.e., an information code in the bar code) is extracted through further analysis of the sequence of pixels. The bar code analyzing means 21 then passes the identifier code contained in the bar code to the data requesting means 22.

Based on the identifier code obtained from the bar code analyzing means 21, the data requesting means 22 generates a request message which contains the identifier code and posts it to the data management means 23, where various service data are stored.

The data management means 23 parses the request message that arrived from the data requesting means 22 and thus obtains the identifier code. The data management means 23 then retrieves the requested data from either the data area 24 in the CPU/Memory processing unit 11 or the remote data base unit 15. If the data is successfully found, the data management means 23 sends the found data to the data distribution means 25.

The data distribution means 25 checks the data received from the data management means 23 and forwards it to the video display means 26 if it is video data. If not, the data is forwarded to the miscellaneous data output means 27. The video display means 26 displays the video data in the form of a video image within a reserved area of the screen of the display unit 12. The miscellaneous data output means 27 outputs the data other than video data to the peripheral units 14, depending on the type of the data.

To summarize the above shortly, when a user selects a bar code on a subject in the video image, the system will automatically translate it into a user's request and provide the user with a relevant service in response to the request.

Figure 3:
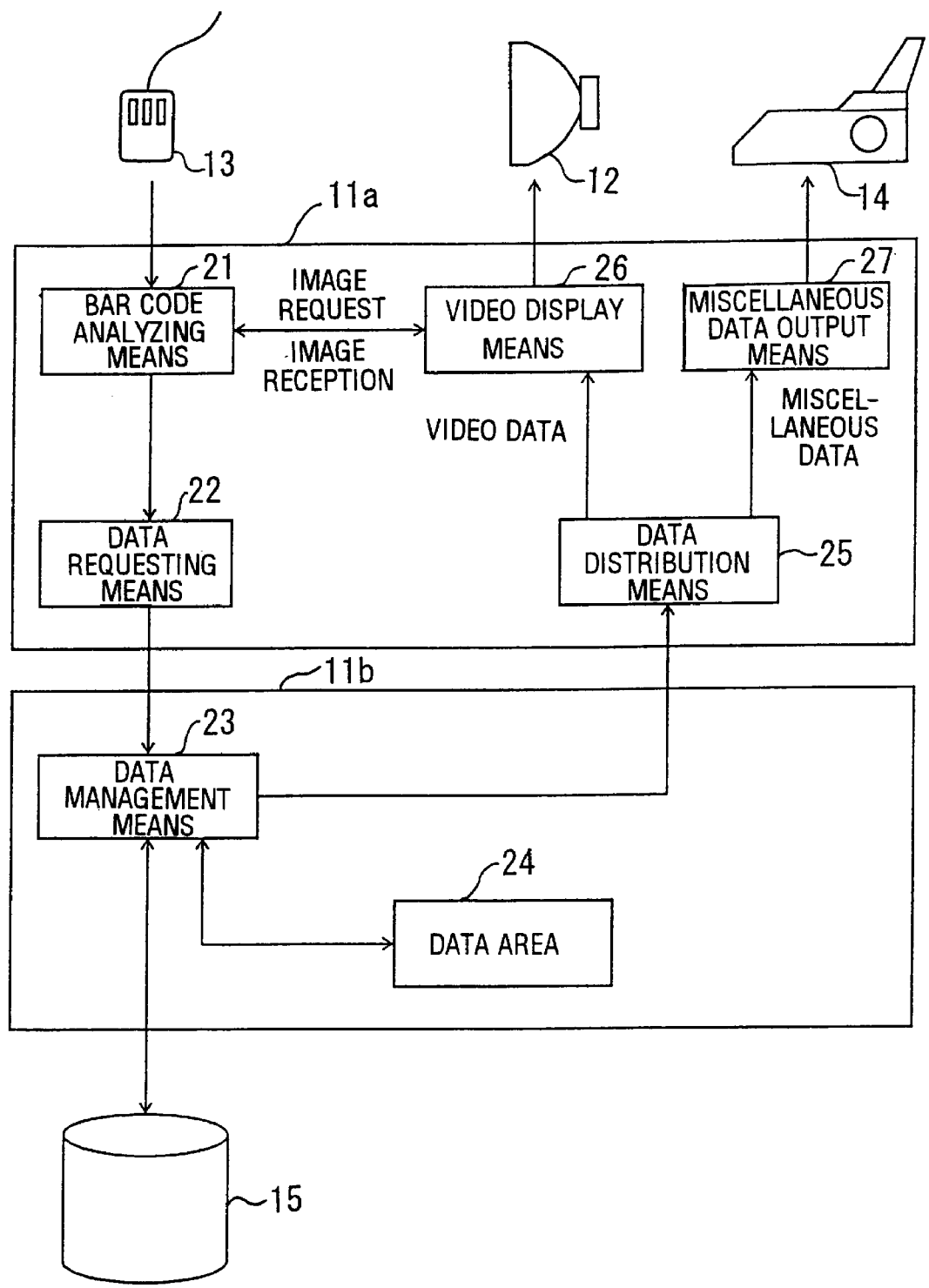
FIG. 3 illustrates a structure of a second embodiment of the present invention.

FIG. 3 illustrates a structure of a second embodiment of the present invention. The first embodiment shown in FIG. 2 exemplifies a stand-alone video presentation system in which a CPU/Memory processing unit 11 would solely support various operations such as management of video images, control of user operations and service provision in response to the user operations. In contrast to the first embodiment, the second embodiment differs in its structure which allows a plurality of units to be connected for management of video images and control of user operations.

That is, the bar code analyzing means 21, the data requesting means 22, the data distribution means 25, the video display means 26, and the miscellaneous data output means 27 operate under the control of a CPU/Memory processing unit 11a, while the data management means 23 and the data area 24 are under the control of another CPU/Memory processing unit 11b. In other words, the CPU/Memory processing unit 11b works as a server and a plurality of clients such as the CPU/Memory processing unit 11a can be connected thereto.

In the CPU/Memory processing unit 11b, the data management means 23 has communication links to the data area 24 and the data base unit 15, and also to the data requesting means 22 and the data distribution means 25 in the CPU/Memory processing unit 11a. Information is exchanged by means of inter-process communications between the data requesting means 22 and the data management means 23 and between the data management means 23 and the data distribution means 25.

Operations in this system are as follows. If a user makes a selecting action using the mouse 13 on a bar code which is affixed to a subject on a screen of the display unit 12, the mouse 13 informs the bar code analyzing means 21 of coordinate values of the position where the user made the action.

The bar code analyzing means 21 requests video information to the video display means 26 and obtains it therefrom. Evaluating a sequence of pixels either in the vicinity of the position, on the raster, or in the area which the user has specified by his/her selecting action, the bar code analyzing means 21 decides whether a particular pattern of the bar code is included or not in the sequence of pixels. If the particular pattern is included, an identifier code is extracted out of the bar code by further analysis of the sequence. The bar code analyzing means 21 passes the identifier code in the bar code to the data requesting means 22.

The data requesting means 22 generates a request message which contains the identifier code and an address to specify the requester (i.e., the CPU/Memory processing unit 11*a*) and posts it to the data management means 23, which is running on the other CPU/Memory processing unit 11*b*.

The data management means 23 parses the received request message and obtains the address of the CPU/Memory processing unit 11*a* and the identifier code. The data management means 23 then retrieves data relevant to the identifier code from the data area 24 or the data base unit 15. If the data is successfully found, the data management means 23 sends the found data back to the data distribution means 25 which is running on the CPU/Memory processing unit 11*a*, or the requester. The data distribution means 25 forwards the received data to the video display means 26 to display it on the screen if it is video data. Otherwise, the data distribution means 25 sends the data to the miscellaneous data output means 27 to output it.

As such, when a user selects a bar code on a subject in the video image, it will be automatically translated into a user's request and a relevant service to the request will be provided to the user. The structure illustrated in FIG. 3 especially allows a plurality of users to enjoy the services.

Figure 4:
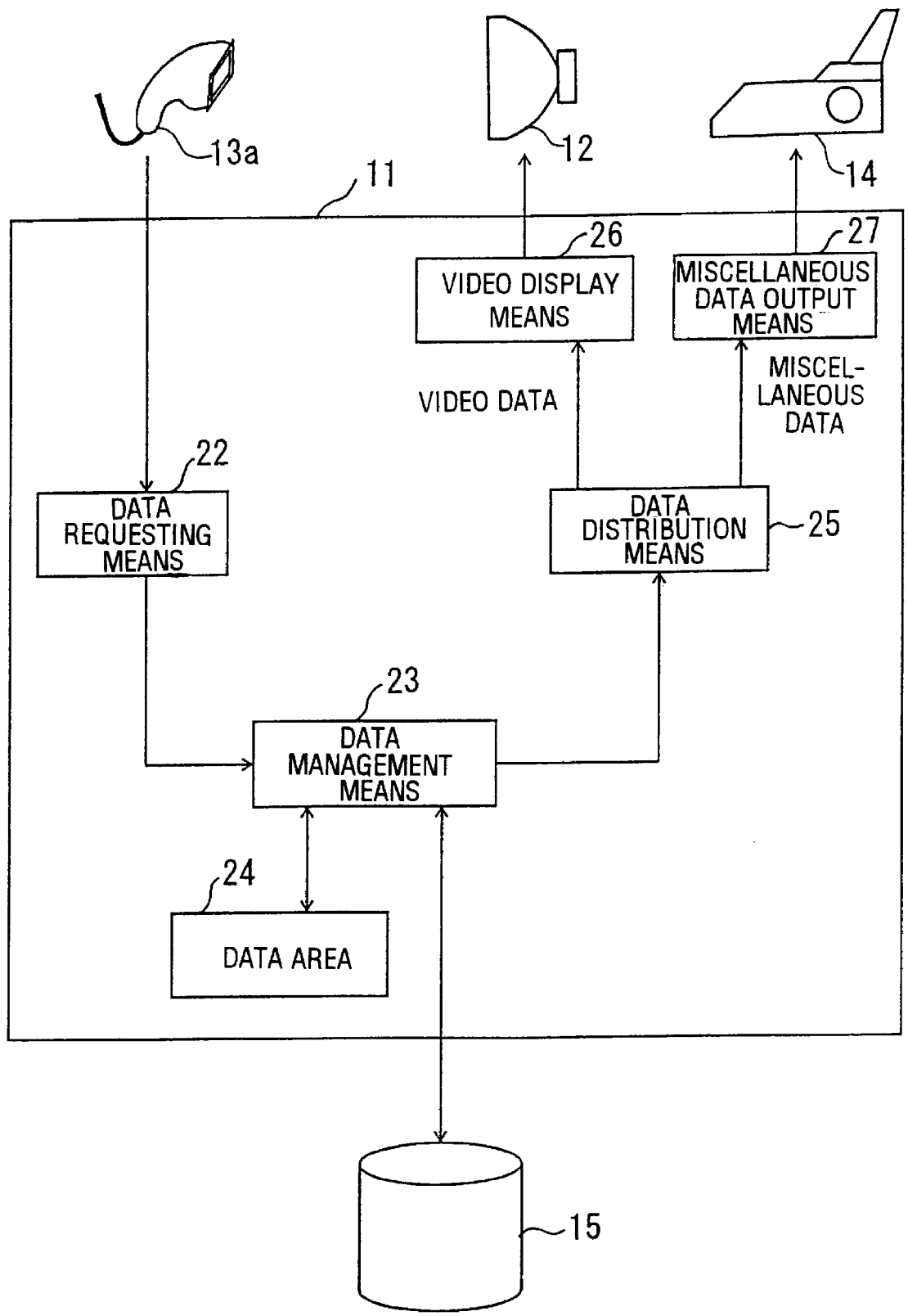
FIG. 4 illustrates a structure of a third embodiment of the present invention.

FIG. 4 illustrates a structure of a third embodiment of the present invention. The structure shown in FIG. 4 is a stand-alone system similar to the system of FIG. 2, however, it differs from the first embodiment of FIG. 2 in its specific structure which employs a bar code reader 13*a* for the identifier recognition means.

The bar code reader 13*a* directly reads out a bar code image displayed on a screen of the display unit 12 by using optical sensing devices. This bar code reader 13*a* also analyzes the read image data and provides a code which the bar code pattern implies. Incidentally, the bar code reader 13*a* is operated by directly putting it on or rubbing it on the screen.

Since the bar code reader 13*a* has above recognition functions, the CPU/Memory processing unit 11*a* only comprises data requesting means 22, data management means 23, data area 24, data distribution means 25, video display means 26, and miscellaneous data output means 27.

Operations in this system are as follows. If a user makes a selecting action using the bar code reader 13*a* on a bar code which is affixed to a subject on a screen of the display unit 12, the bar code reader 13*a* directly reads out a sequence of pixel values of the bar code image displayed on the screen of the display unit 12 by using optical sensing devices and analyzes it to obtain an identifier code. The bar code reader 13*a* passes the identifier code in the bar code to the data requesting means 22.

The data requesting means 22 generates a request message which contains the identifier code and posts it to the data management means 23. The data management means 23 extracts the identifier code from the received request message and then searches the data area 24 or the data base unit 15 for data relevant to the identifier code. If the data is successfully found, the data management means 23 sends the found data to the data distribution means 25.

The data distribution means 25 forwards the received data to the video display means 26 to display it on the screen if it is video data. If not, the data is forwarded to the miscellaneous data output means 27 to output it. The video display means 26 forwards the data to the display unit 12 to display it on the screen. The miscellaneous data output means 27 outputs the data other than video data to the peripheral units 14 to provide the user with other services.

Figure 5:
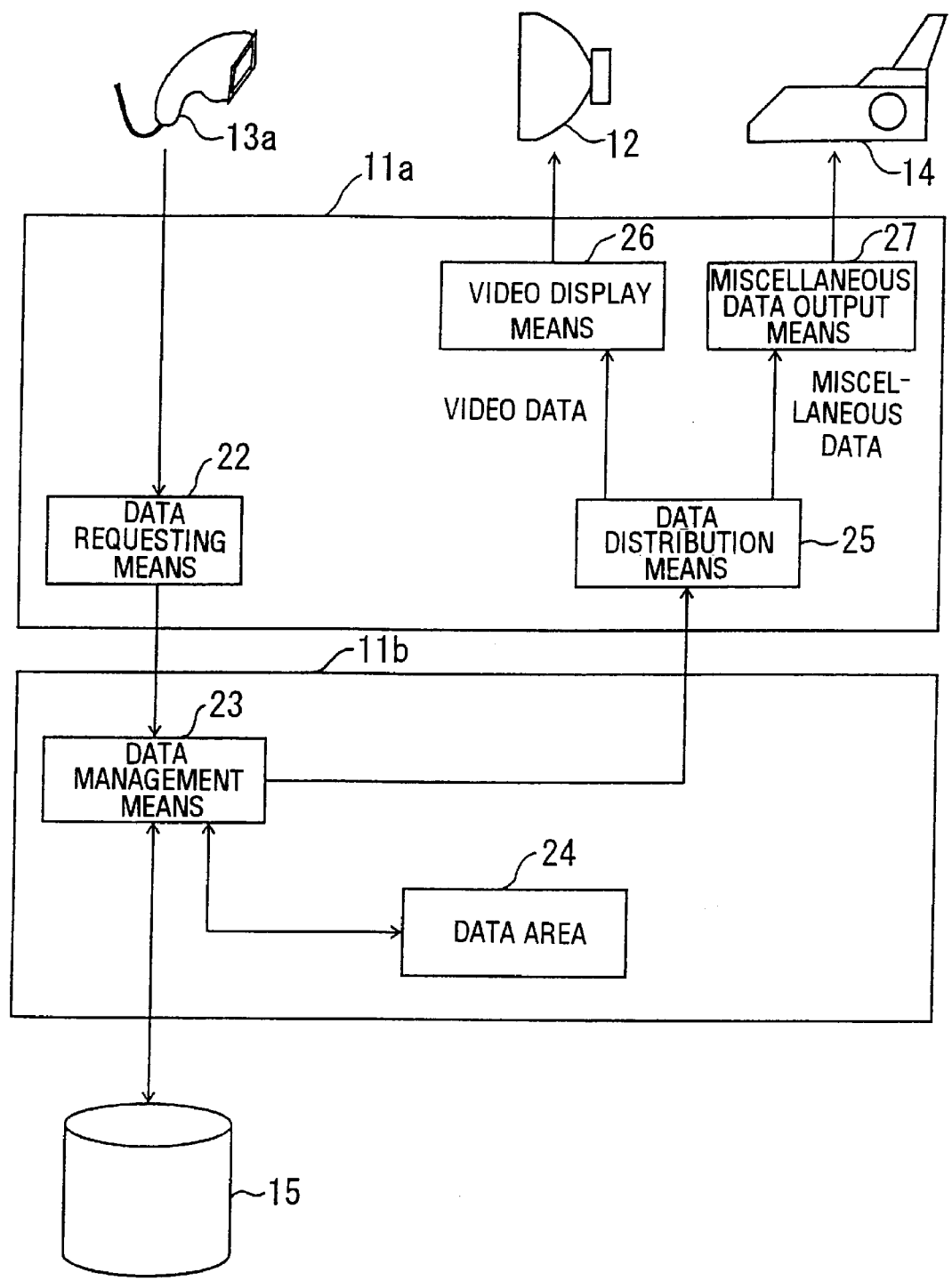
FIG. 5 illustrates a structure of a fourth embodiment of the present invention.

FIG. 5 illustrates a structure of a fourth embodiment of the present invention. The fourth embodiment is a system in which a bar code reader 13*a* serves as identifier recognition means, a single CPU/Memory processing unit 11*a* manages both video images and user operations, and another CPU/Memory processing unit 11*b* deals with services corresponding to the user operations.

In the CPU/Memory processing unit 11*b*, the data management means 23 has communication links to the data area 24 and the data base unit 15. Information is exchanged by means of inter-process communications between the data requesting means 22 and the data management means 23, and also between the data management means 23 and the data distribution means 25.

Operations in this system are as follows. When a user makes a selecting action using the bar code reader 13*a* on a bar code which is affixed to a subject on a screen of the display unit 12, the bar code reader 13*a* directly reads out a sequence of pixel values of the bar code image displayed on the screen of the display unit 12 by using an optical sensing device and analyzes it to obtain an identifier code.

The bar code reader 13*a* passes the obtained identifier code to the data requesting means 22. The data requesting means 22 generates a request message which contains an address to identify the CPU/Memory processing unit 11*a* and the identifier code and posts the request message to the data management means 23, which is running on the other CPU/Memory processing unit 11*b*.

The data management means 23 extracts the address of the CPU/Memory processing unit 11*a* and the identifier code from the received request message and then searches the data area 24 or the data base unit 15 for data which is relevant to the identifier code. If the data is successfully found, the data management means 23 sends the found data to the data distribution means 25, which is running on the CPU/Memory processing unit 11*a*, or the requester.

The data distribution means 25 forwards the received data to the video display means 26 to display it on the screen of the display unit 12 if it is video data. If not, the data is forwarded to the miscellaneous data output means 27 to output it to the peripheral units 14.

In the way described above, when a user selects a bar code on a subject in the video image, the system will automatically translate into a user's request and provide the user with a relevant service. The structure of FIG. 5 especially allows a plurality of users to enjoy the services.

Figure 6:
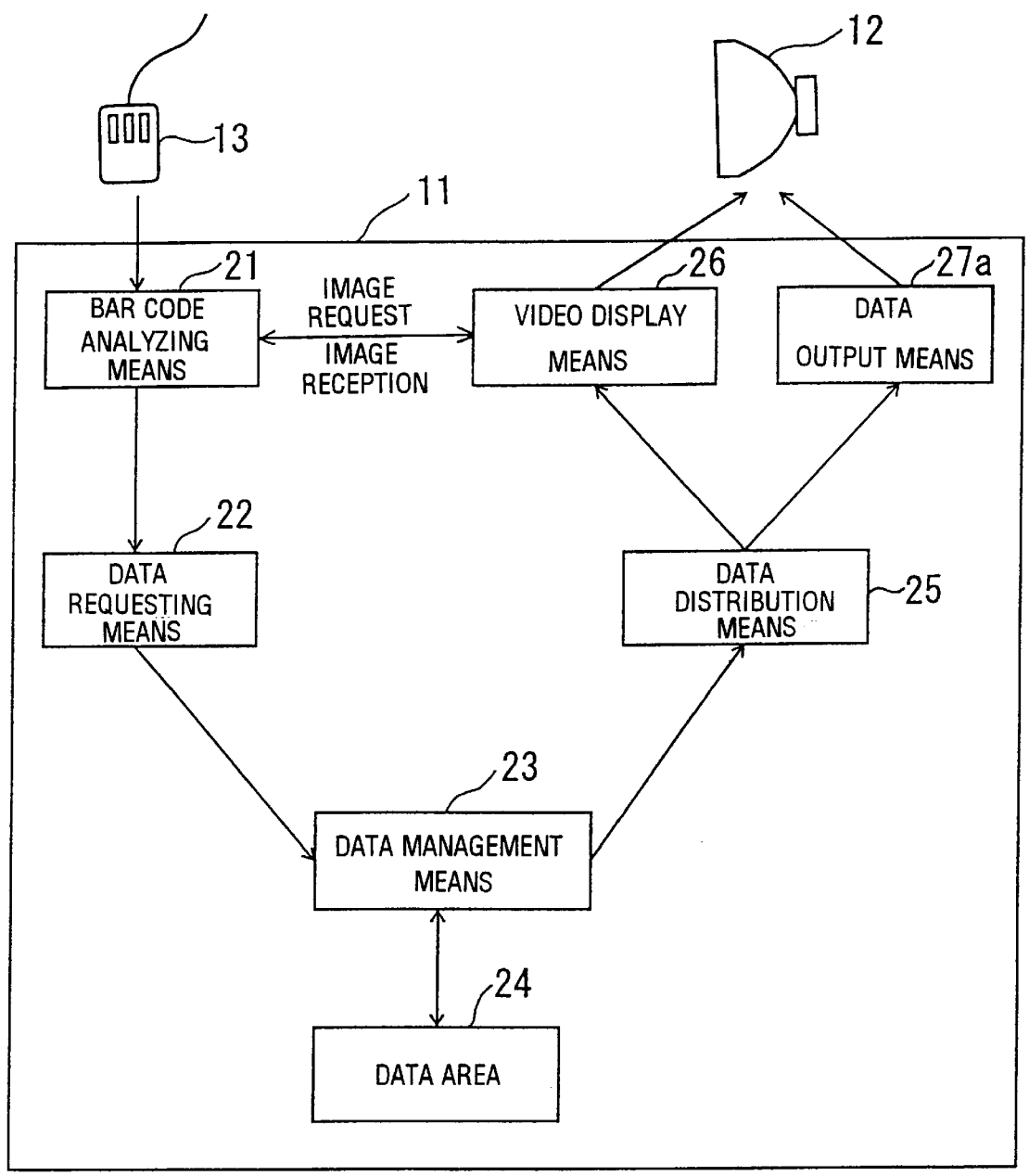
FIG. 6 illustrates a structure of a fifth embodiment of the present invention.

FIG. 6 illustrates a structure of a fifth embodiment of the present invention. According to the fifth embodiment of FIG. 6, a video presentation system is provided, in which a mouse 13 is employed as identifier recognition means, a display unit 12 displays video data as well as the other data such as characters or numerical data, and a CPU/Memory processing unit 11 solely keeps all data including the video data.

In the CPU/Memory processing unit 11, the following means are implemented in a single CPU/memory environment to provide services as a video presentation system. They are: bar code analyzing means 21 interfaced with the mouse 13, data requesting means 22, data management means 23, data area 24, data distribution means 25, video display means 26 and data output means 27a which are connected to the display unit 12.

If a user makes a selecting action somewhere on the screen of the display unit 12, the mouse 13 detects its coordinates and sends it to the bar code analyzing means 21. From those coordinates and related video image obtained from the video display means 26, the bar code analyzing means 21 extracts and analyzes a bar code therein. The data requesting means 22 passes a request message, or numerical information involved in the bar code, to the data management means 23.

Parsing the received request message, the data management means 23 obtains the numerical information and then searches the data area 24 for data associated with the numerical information. The result of the search is passed on to the data distribution means 25. The data area 24 stores video data for various scenes and further video data as well as character strings and numerical data which are all associated with the bar codes embedded in respective scenes.

The data distribution means 25 forwards the received data to the video display means 26 if it is video data. If not, the data is forwarded to the data output means 27a. The video display means 26 displays the received video data as a video image on a reserved screen area of the display unit 12. The data output means 27a opens a window having a necessary format and displays the received character strings or numerical data in that window.

Figure 7:
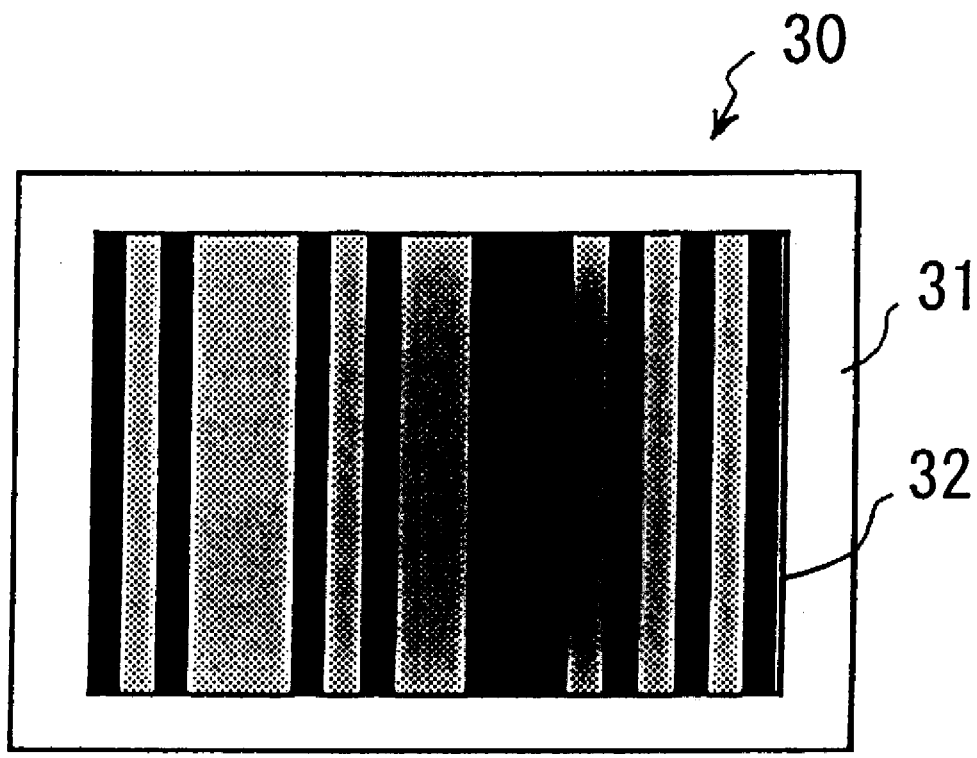
FIG. 7 shows an outline of bar code.

FIG. 7 shows an outline of bar code, which is employed in some of the embodiments of the present invention. The bar code illustrated in FIG. 7 represents a binary number "001010011101." In this example, it is assumed that the identifier codes to identify subjects can be expressed in binary numbers of up to 12 digits. The more subjects needed, the more bars the bar code would have.

In FIG. 7, a bar code 30 is constructed by two parts. One is an outer frame 31 for bounding the bar code to distinguish it from other objects in the video image, and the other is a code part 32 where some stripes are arranged in accordance with respective binary digits, 0's and 1's. The outer frame 31, stripes for "0" and stripes for "1" are colored white, red and black, respectively.

Figure 8:
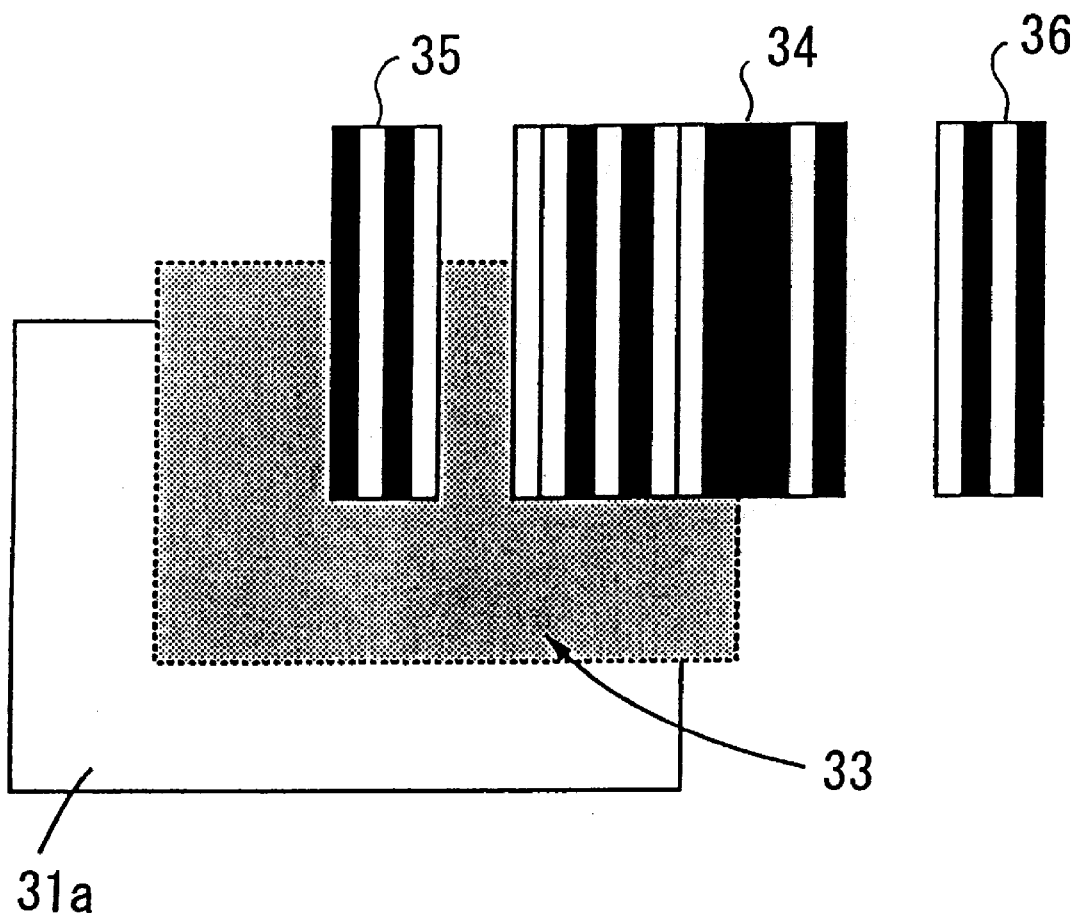
FIG. 8 shows a structure of bar code.

FIG. 8 shows a structure of bar code. The bar code 30 in FIG. 7 is composed of: a white base 31a for the outer frame 31 surrounding the code part 32, a red ground 33 for filling the gaps between black stripes, and the code part 32 contains the black stripes. The code part 32 is further composed of a body 34 representing an information code and delimiters 35 (left) and 36 (right) on the respective sides of the body 34.

The red ground 33 is for the purpose of distinguishing a rectangular space for the stripes from the white base 31a that forms the outer frame 31. As for a pigment to be used for the ground 33, another color will do as long as it has small enough reflectance of either red, green or blue and high enough reflectance of another one of them. A red pigment is used here because its reflectance of green or blue is as negligibly small as that of black, and oppositely, that of red is as high as that of white.

Structure of the code part 32 is such that the body 34 is put between the left delimiter 35 and the right delimiter 36. The left delimiter 35 reads "1010" from left to right and the right delimiter 36 likewise reads "0101." The body 34, in this embodiment, is a sequence of 12 bars, each of which is black for "1" or transparent for "0," totally representing "001010011101."

Such bar codes are affixed to subjects and video data is created by taking their pictures with a video camera. Next, it will be explained how to recognize a bar code when it appears in a screen displaying such video data.

A bar code displayed on a display screen can be recognized by analysis of its image data, which is electronic display data in case of using a mouse to select it or optical image data in case of using a bar code reader to catch it.

Figure 9:
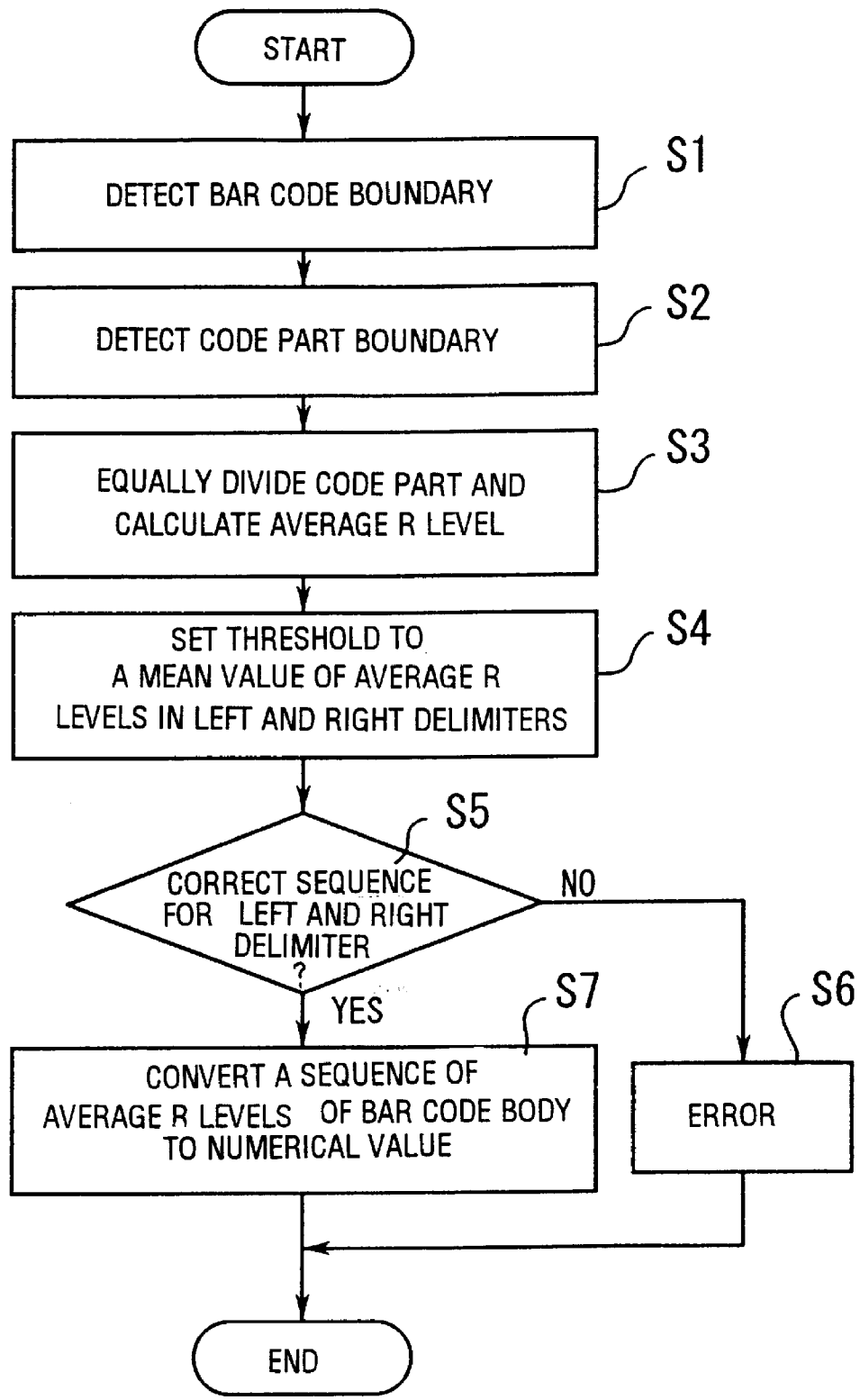
FIG. 9 is a flowchart describing a procedure of bar code analysis.

FIG. 9 is a flowchart describing a procedure of bar code analysis.

Step S1 When a user selects a bar code on a video screen, a boundary of the bar code is first detected. That is, blue level of each pixel is checked scanning on a raster where the bar code resides, thus finding the highest level and the lowest level. The reason for checking the blue level is that red pigment is used for the bar code ground and it contains few blue components. A mean level between the highest and lowest blue levels will be used as a threshold to find a bar code boundary, or a white outer frame.

Step S2 A boundary of the code part is detected. That is, starting from the point that the user made a selective operation, the pixels along the raster are again evaluated in the both directions, left and right. There must be a point where the blue level exceeds the threshold determined at step S1, and that is either a right or left boundary of the bar code. It is because the code part is colored red or black which has almost no blue component, and on the other hand, the outer frame of the bar code is white whose blue level is near maximum. The boundaries thus obtained on the selected raster define a part occupied by the bar code.

Step S3 The part occupied by the bar code (i.e., the code part) is equally divided into small pieces and average R levels are calculated. To be more specific, the part is divided by the number of code digits, which is 20 in this embodiment, and red levels of all pixels involved in each piece are averaged for noise reduction, thus obtaining the average R levels, where R stands for red. This step can include further averaging calculations such that the same operations as above are carried out with a raster adjacent to the selected raster (i.e., the just upper or lower rasters) and the average of three rasters is then taken. The average R levels are thereby obtained for the left delimiter 35, the body 34 and the right delimiter 36.

Step S4 Threshold for digitizing is determined from the average R levels of the left and right delimiters. Digitizing of the left and right delimiters 35 and 36 is expected to result in four 0's and four 1's, which simply means that there are four bars below the threshold and four bars over the threshold. Based on this expectation, the average R levels of the left delimiter 35 and the right delimiter 36 are all listed up and the fourth and fifth highest ones among them are taken. The threshold is then set to a mean level of the two average R levels, since the fourth and fifth levels are most likely ones among them.

Step S5 Bit sequences of the left delimiter 35 and the right delimiter 36 are digitized and checked by using the threshold determined in step S4.

Step S6 If the bit sequence of the left delimiter 35 is not "1010" or the right delimiter 36 is not "0101," it is regarded as an error and this bar code analysis ends in failure.

Step S7 If it is found that their respective bit sequences conforms to the predetermined and correct sequences, the average R levels of the body 34 are digitized with the threshold determined in step S4 so as to convert them into a 12-bit numerical value.

According to the above-described analyzing method, it is possible to read bar codes, as long as each bar lies on three or more pixels, even in a video image taken with an ordinary video camera under lighting with tungsten or fluorescent lamps. This method, however, excludes the case that the bar codes are too much inclined to horizontal.

Figure 10:
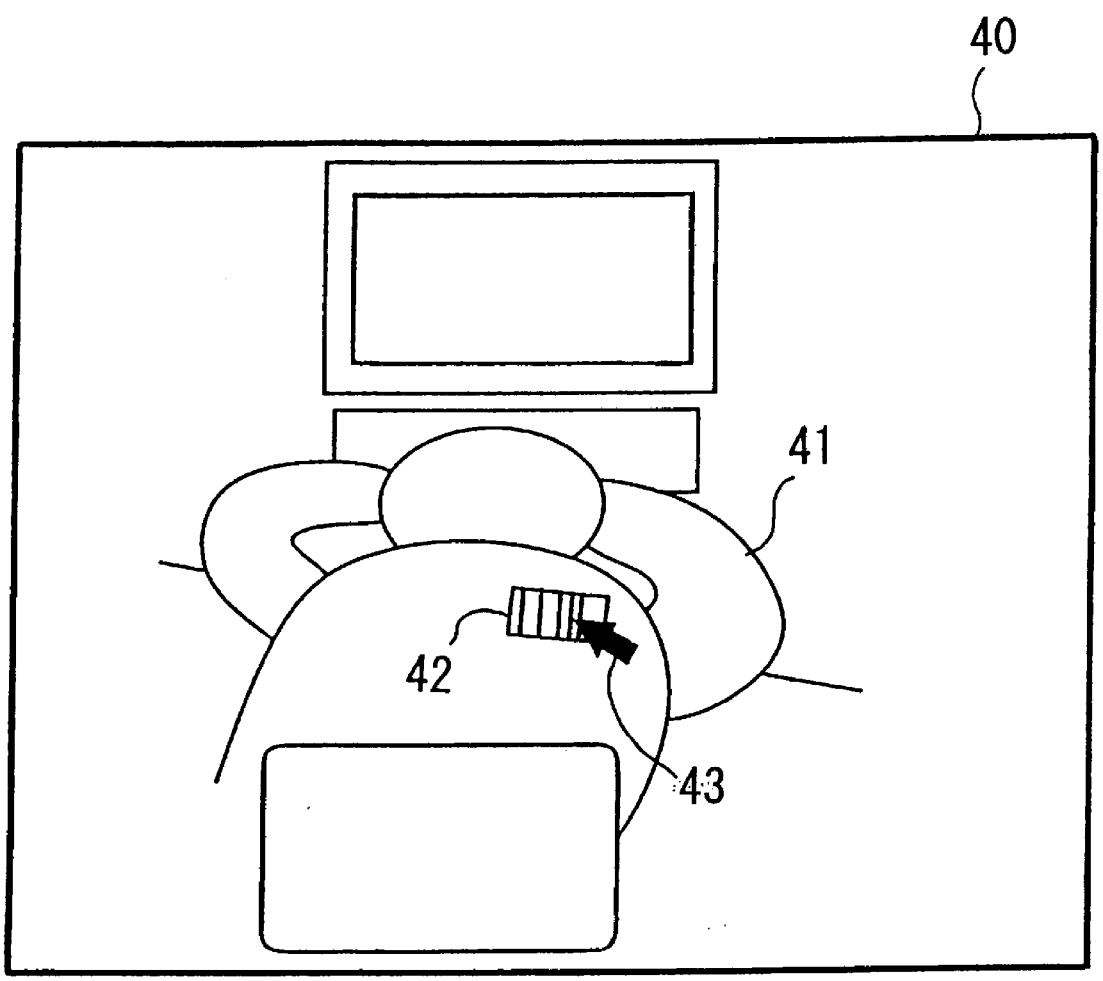
FIG. 10 illustrates a video image before an identifier is selected.

FIG. 10 illustrates a video image before an identifier is selected. A window 40 is open in a display screen, which shows a subject 41 (a man who is asleep, for example) with a bar code 42, affixed on his shoulder as an identifier. A mouse cursor 43, shown as an arrow in FIG. 10, is pointing at the bar code 42 for selection of an identifier.

When the mouse cursor 43 is positioned on the bar code 42, a click on a mouse button indicates to the system that the user has selected the bar code 42. Triggered by this selection, the video presentation system fetches registered data in accordance with the bar code 42, thus coming up with a new scene in the window 40 following the scene of the sleeping man.

Figure 11:
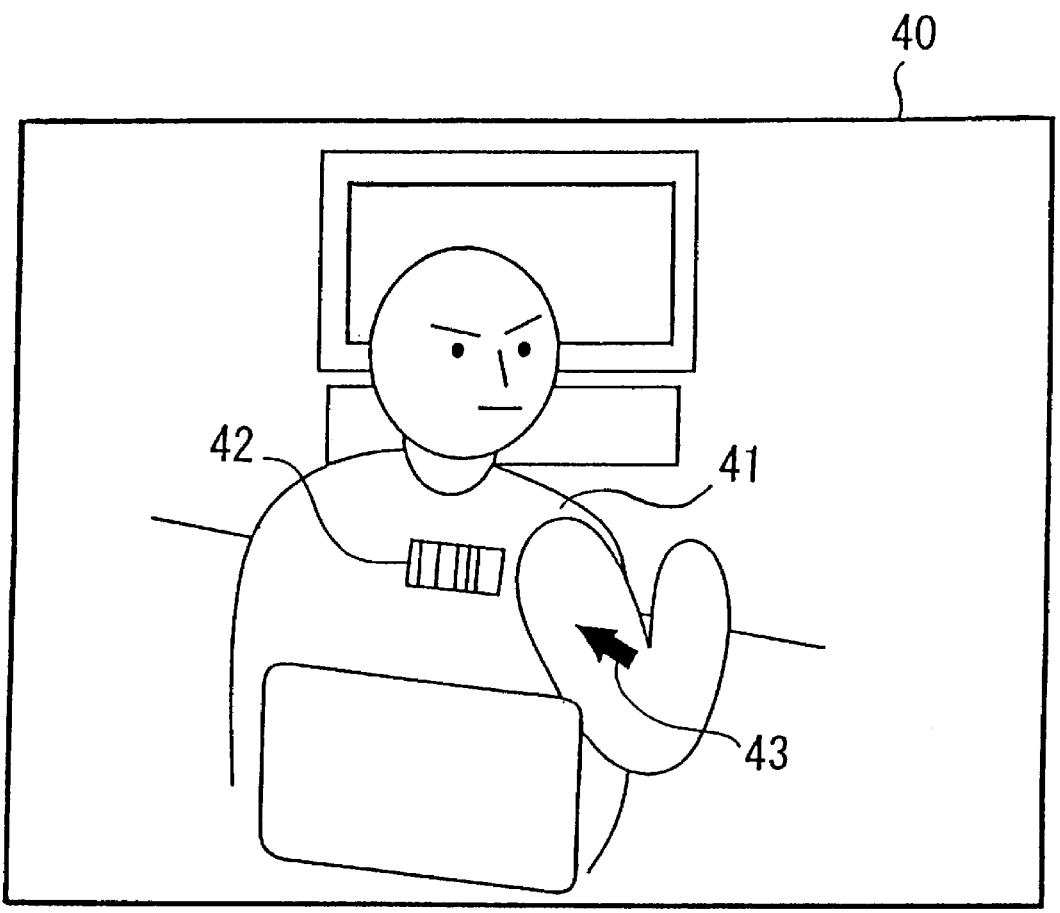
FIG. 11 illustrates a video image after an identifier is selected.

FIG. 11 illustrates a video image after the identifier is selected. The window 40 shows that the man wakes up and turns his face in response to the identifier selection operation with the mouse.

As described above, when a user selects a bar code affixed to a subject in a display screen, another service linked to the subject is provided to the user. In this example, a new video clip is provided to show that the man wakes up and turns his face.

Bar codes are assumed so far to be affixed to each subject, however, it is also possible to embed (or superimpose) the bar codes into the video clips by using a telop (television opaque projector) technique. In addition, the identifiers may be other means than bar codes, such as character strings or numerals, for example, as long as the system can recognize them.

The present invention, as described above, provides a structure that identifiers affixed to subjects in a video image are recognized and a service associated with each subject is extracted from data storing means.

The identifiers embedded in the video image, therefore, can be used as trigger buttons to initiate specific services. All the things required for communications between requests issued by the identifiers and a service-providing module in the system are only user address and identifier code. Such simple protocols promise easy development of interactive multimedia applications.

Furthermore, since the subjects in the video image are well linked with related services, the users can enjoy a sense of immediacy as directly interacting with the subjects.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A video presentation system having a display unit to display a motion video image, in which a user's pointing operation at a subject in the motion video image initiates a particular service associated therewith, the video presentation system comprising:

an identifier having a specific image data pattern, which is directly affixed to the subject, and an image of which is captured together with the subject by using a video camera;

video display means for displaying the motion video image that shows both the subject and the identifier on a screen of the display unit;

data storing means for storing the video data and data prepared for the service associated with said identifier;

identifier recognition means for recognizing the identifier displayed on the screen by extracting a part of the motion video image in the vicinity of a position designated by the user's pointing operation and comparing a bit pattern thereof with the specific image data pattern of said identifier; and data management means for obtaining the data prepared for the service from said data storing means, based upon said identifier recognized by said identifier recognition means, and for sending the obtained data prepared for the service to said video display means.

2. A video presentation system according to claim 1, wherein said identifier recognition means comprises data requesting means for requesting said data management means to provide a service which is associated with the identifier code obtained by said identifier analyzing means.

3. A video presentation system according to claim 1, wherein said identifier recognition means is an identifier reading device which directly reads out visual information of the identifier which is displayed on the screen of the display unit, extracts therefrom an identifier code representing the identifier, and sends the identifier code to said data management means.

4. A video presentation system according to claim 3, wherein said data storing means is an external data base unit.

5. A video presentation system according to claim 1, wherein said video display means, said identifier recognition means, said data storing means, and said data management means constitute a CPU/Memory processing unit.

6. A video presentation system according to claim 5, further comprising:

miscellaneous data output means for outputting miscellaneous data related with the identifier to peripheral units coupled to said CPU/Memory processing unit and data distribution means for classifying the data, which is received from said data management means, into video data and other data, and forwarding the video data to said video display means and the other data to said miscellaneous data output means.

7. A video presentation system according to claim 1, wherein said video display means and said identifier recognition means constitute a first CPU/Memory processing unit, said data storing means and said data management means constitute a second CPU/Memory processing unit, and said data management means exchanges data to and from said identifier recognition means and said video display means by way of inter-process communications.

8. A video presentation system according to claim 7, wherein said identifier recognition means further comprises data requesting means for requesting said data management means in said second CPU/Memory processing unit to provide a service associated with the identifier code obtained by said identifier analyzing means as well as an address for specifying said first CPU/Memory processing unit.

9. A video presentation system according to claim 7, wherein said first CPU/Memory processing unit further comprises:
- miscellaneous data output means for outputting miscellaneous data related with the identifier to peripheral units coupled to said first CPU/Memory processing unit; and
- data distribution means for classifying the data received from said data management means into video data and other data, and forwarding the video data to said video display means and the other data to said miscellaneous data output means.

10. A video presentation system according to claim 7, wherein said data storing means is data area allocated within said second CPU/Memory processing unit.

11. A video presentation system according to claim 1, wherein the identifier is a bar code affixed to the subject.

12. A video presentation system having a display unit to display a motion video image, in which a user's pointing operation at a subject in the motion video image initiates a particular service associated therewith, the video presentation system comprising:

- a bar code having a specific image data pattern, whose image is embedded in the motion video image by using a technique of telop;
- video display means for displaying the motion video image that shows both the subject and the bar code on a screen of the display unit;
- data storing means for storing the video data and data prepared for the service associated with said bar code;
- identifier recognition means for recognizing the bar code displayed on the screen by extracting a part of the video image in the vicinity of a position designated by the user's pointing operation and comparing a bit pattern thereof with the specific image data pattern of said bar code; and
- data management means for obtaining the data prepared for the service from said data storing means, based upon said bar code recognized by said identifier recognition means, and for sending the obtained data prepared for the service to said video display means.

* * * * *